March 10, 1925.
S. L. GOOKIN
STARTING AND STOPPING MECHANISM
Filed April 22, 1921
1,528,823
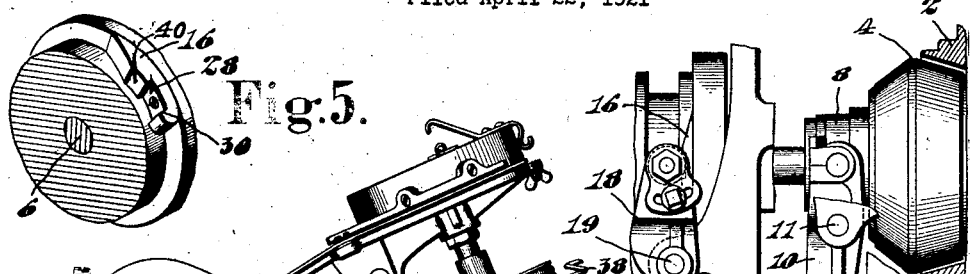
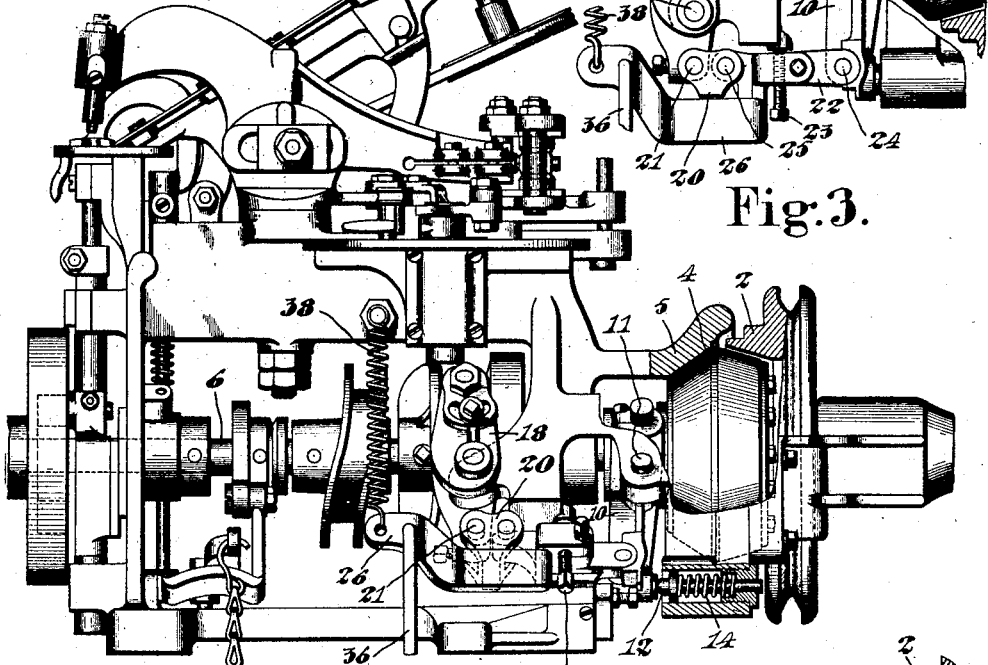
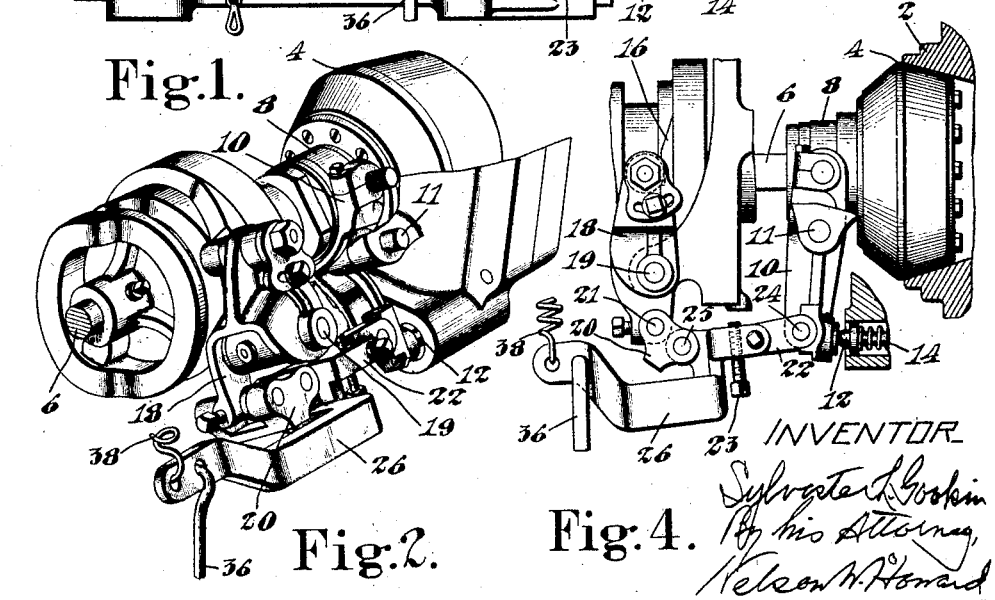

Patented Mar. 10, 1925.

1,528,823

UNITED STATES PATENT OFFICE.

SYLVESTER LEO GOOKIN, OF SOUTH BOSTON, MASSACHUSETTS, ASSIGNOR TO UNITED SHOE MACHINERY CORPORATION, OF PATERSON, NEW JERSEY, A CORPORATION OF NEW JERSEY.

STARTING AND STOPPING MECHANISM.

Application filed April 22, 1921. Serial No. 463,517.

*To all whom it may concern:*

Be it known that I, SYLVESTER L. GOOKIN, a citizen of the United States, residing at South Boston, in the county of Suffolk and State of Massachusetts, have invented certain Improvements in Starting and Stopping Mechanisms, of which the following description, in connection with the accompanying drawings, is a specification, like reference characters on the drawings indicating like parts in the several figures.

This invention relates to starting and stopping mechanisms. The invention is herein illustrated as embodied in a mechanism of the type wherein a clutch and brake mechanism, partially under manual control, is operated to disengage the clutch and apply the brake at a predetermined point in the cycle of operations of the machine so that the operating parts will come to rest always in substantially the same positions. In previous constructions of this type of mechanism considerable pressure is applied to the brake, through transmission devices, by a clutch-thrower or stop cam, to stop the machine and it has required considerable strength for the operator to move a controller to bring the parts past a dead center to an inoperative position of the transmission devices so as to overcome the resistance on the brake and start the machine. Alternately, it has been necessary to have an auxiliary locking device to hold the parts locked in nearly aligned position but on the free side of the dead center.

With these considerations in view, an object of the present invention is to facilitate the control of a machine equipped with such a clutch without complicating the mechanism by the addition of an auxiliary locking device. To this end, a feature of the invention consists in relieving the pressure upon the transmission devices after the brake has been operated and preferably before the machine has been brought to a stop. Another feature of the invention consists in maintaining a substantially constant pressure on the brake for an interval before the pressure is relieved, in order that nearly all of the momentum of the machine will be absorbed by the brake. A further feature of the invention consists in providing means for stopping the machine in a predetermined position by means other than the brake after the pressure, applied to the brake through the transmission devices, has been relieved.

By the present invention, a starting and stopping mechanism is provided which may be started easily when desired, which will stop with certainty with the parts in the desired position and which may be applied to existing machines at slight expense. Furthermore, there is no danger of the machine starting accidentally from the vibration of the loose pulley.

The present invention will be illustrated and described for convenience as embodied in a mechanism employing a clutch and brake substantially identical with those shown in Letters Patent of the United States No. 1,048,840, dated December 31, 1912. Nothing herein contained is to be construed, however, as limiting this invention in its application to use in connection with devices shown in said patent, or with devices of like character, since the following detailed description relating to such devices treats of a preferred construction which is used for purposes of exemplification only.

In the accompanying drawings:—

Fig. 1 is a side elevation of an eyeleting machine provided with the starting and stopping mechanism of the present invention, showing the transmission devices locked in effective position, the brake applied and the clutch disengaged.

Fig. 2 is a perspective view of the starting and stopping mechanism only, with its parts in the same position as in Fig. 1.

Fig. 3 is an enlarged side elevation of the starting and stopping mechanism only, with the pressure on the transmission devices and brake relieved and with the parts stopped in a predetermined position.

Fig. 4 is a side elevation, on the same scale as Fig. 3, with the parts in the position that they occupy just after the clutch has been tripped but before any revolution of the machine has taken place.

Fig. 5 is a detail, in perspective, of the clutch thrower or stop cam for shifting the friction member, as modified in accordance with the present invention.

Referring to the specific starting and stopping mechanism shown in the drawings, 2 is a driving clutch member driven by a belt from a suitable source of power. A friction member 4, having two oppositely disposed frusto-conical friction surfaces, is mounted to slide longitudinally or axially, between clutch engaging and brake applying positions, on a shaft 6 and to rotate only therewith; said shaft being conveniently the driving shaft of the machine to be operated by the starting and stopping mechanism. One of these friction surfaces co-operates with the driving clutch member 2 and acts as the driven clutch member when these two members are in clutch engaging position. On the other hand, the other frusto-conical surface of the friction member 4 co-operates with the surface of a stationary brake member 5 and acts as one of the brake members, when these two members are in brake applying position, to arrest its own rotation and that of the shaft 6 connected therewith. The friction member 4, which thus serves both as a clutch member and as a brake member, is moved back and forth axially on the shaft 6 by a collar 8, rotatably mounted on the hub of the friction member 4, and a shifting arm 10 pivoted at 11 and engaged with said collar. A plunger 12 mounted in a recess in the frame of the machine is forced forwardly by a spring 14 so that the plunger is kept in contact with the lower end of the shifting arm. When unimpeded, the said spring holds the shifting arm 10 in position to cause the clutch to engage, that is, to cause the friction member 4 to engage the driving clutch member 2. When desired, the clutch is disengaged and the brake is applied by a clutch thrower or stop cam 16, mounted on the shaft 6, and transmission devices which can be rendered effective, at the will of the operator, to communicate the motion of the cam 16 to the friction member 4. These transmission devices comprise a cam lever 18 pivoted at 19, a toggle link 20 pivoted at 21 to the lower end of the cam lever 18, a second toggle link 22 pivoted to the first at 25, and the above mentioned shifting arm 10 to the lower end of which the link 22 is pivoted at 24. When the toggle links are held in substantial alignment but with the pivot 25 slightly beyond the dead center (i. e., above the line connecting the centers of the pivots 21 and 24) effective communication is established between the cam 16 and friction member 4 so that the cam will act at the proper time to disengage the clutch and apply the brake. However, when the toggle is opened by bringing the parts past the dead center and out of alignment, effective communication through the transmission devices is interrupted and, until the toggle links are again brought into substantial alignment above the dead center, the spring 14 will hold the clutch in engagement to drive the shaft. The above described devices are substantially identical to corresponding parts shown in the patent previously referred to and for further understanding of said devices and their operation, reference may be had to said patent.

As described above, a machine driven by the shaft 6 is stopped by bringing the toggle links into substantial alignment so that the cam 16 may act to disengage the clutch through the rigid arm thus constituted by the links 20 and 22. If the toggle links are not held firmly at this time, the impact of the cam 16 against the lever 18 is liable to open the toggle and permit the machine to overrun. This may be prevented by having the toggle closed in a position considerably past the dead center. When this is done, however, it requires considerable strength on the part of the operator to move the controller, hereinafter described, to bring the links past the dead center to open the toggle, as considerable pressure is already applied to the brake through the toggle and this must be increased until the links are brought into a straight line position or on a dead center. These excessive strains are objectionable as they cause greater wear on the parts and sometimes breakage.

It is thus desirable to relieve the strain on the parts as soon as the momentum of the shaft has been nearly overcome. To this end a recess 28 in the clutch thrower or stop cam 16 has been provided so that, after the parts have been slowed down nearly to a stop, the cam roll enters this recess and the strain on the links is relieved. With means thus provided for relieving this strain, the toggle is conveniently locked in effective (or closed) position to stop the shaft 6 by the usual tension spring 38 acting on an extension 26 of the toggle link 22, with the link adjusted to a safe position above the dead center by means of the stop screw 23 located in the link and arranged to strike against a fixed abutment. Subsequently, only a nominal force is required on the treadle rod 36 to open the toggle and permit the brake to be released and the clutch to be engaged. It will be seen that the treadle rod 36 and tension spring 38 thus constitute a controller by which the starting and stopping of the shaft is governed by the operator; the position of these parts determining whether the toggle is open or closed.

In view of the fact that the shaft has not been stopped at the time that the brake is relieved, the stop cam is provided with an abutment 30 which, by striking the cam roll on the lever 18, serves as a stop to bring the machine to a standstill at a predetermined point in its cycle of operations. However, the mechanism may be adjusted, by adjusting the relative positions of the cam roll and the cam lever 18, so that the momentum is used up while the cam roll is in the recess 28 and before the abutment 30 is quite reached. As an aid in absorbing the momentum of the machine, the brake is applied with a substantially constant pressure for an interval before the pressure is relieved. This is accomplished by providing the stop cam 16 with a flat portion 40 so that no movement is given to the brake during this interval.

In the above specification and in the following claims defining the invention, the word "relieve" is used with reference both to the strain on the transmission devices and to the brake, to describe a lessened pressure thereon and it is to be understood thereby that the pressure may be lessened to a limited extent or wholly removed and still be within the terms of the word as intended.

Having thus described the invention, what is claimed as new and desired to be secured by Letters Patent of the United States is:—

1. A starting and stopping mechanism having, in combination, a shaft, a brake, a clutch, means for engaging the clutch, and a clutch thrower for disengaging the clutch and applying the brake, said clutch thrower being constructed and arranged to apply the brake with increasing pressure for a predetermined period and thereafter to maintain substantially constant pressure on the brake for a predetermined period and then to relieve the brake before the shaft has been completely stopped.

2. A starting and stopping mechanism having, in combination, a shaft, a brake, a clutch, means for engaging the clutch, a clutch thrower for disengaging the clutch and applying the brake, said clutch thrower being constructed and arranged to apply the brake with increasing pressure for a predetermined period and thereafter to maintain substantially constant pressure on the brake for a predetermined period and then to relieve the brake, and means for stopping the shaft after the brake has been relieved.

3. A starting and stopping mechanism having, in combination, a shaft, a driving clutch member, a stationary brake member, a friction member connected to rotate with the shaft and longitudinally movable thereon into engagement with either of said other members to drive or to stop the shaft, and mechanism operated by the shaft and constructed and arranged to shift the friction member to engage the stationary brake member and then to relieve the pressure thereon prior to the stopping of the shaft.

4. A starting and stopping mechanism having, in combination, a shaft, a driving clutch member, a stationary brake member, a friction member connected to rotate with the shaft and longitudinally movable thereon into engagement with either of said other members to drive or to stop the shaft, mechanism operated by the shaft to shift the friction member to engage the stationary brake member and then to relieve the pressure thereon, and means to stop the shaft in a predetermined position.

5. A starting and stopping mechanism having, in combination, a clutch, a brake, means for engaging the clutch, a clutch thrower, transmission devices for communicating the action of the clutch thrower to disengage the clutch and apply the brake, a controller for establishing and interrupting effective communication through the transmission devices and automatic means to relieve the strain on the transmission devices after they have operated in order to facilitate operation of the controller.

6. A starting and stopping mechanism having, in combination, a clutch, means for engaging the clutch, a clutch-thrower for disengaging the clutch, transmission devices including a toggle, a controller which moves the links of said toggle in opposite directions past a dead center for respectively establishing and interrupting effective communication through the transmission devices, and means for relieving longitudinal pressure on the toggle prior to movement of the links past the dead center.

7. A starting and stopping mechanism having, in combination, a brake, a clutch, a clutch thrower, transmission means including pivoted pieces, means for holding said pieces in substantial alinement but slightly beyond their dead center to transmit the action of the clutch-thrower to the clutch and brake, means for moving the pieces to the opposite side of the dead center and into unalined position to interrupt the effective communication through the transmission means, and means to relieve the pressure on the pieces to permit easy movement past the dead center.

8. A starting and stopping mechanism having, in combination, a shaft, a brake, a clutch, means tending normally to move the clutch into engagement, an intermittently acting cam for throwing the clutch out of and the brake into engagement, links interposed between said cam, clutch and brake, one of said links being so arranged as to receive at all times the intermittent motion from said cam, means under the control of the operator for arranging said links so that the motion of the cam shall be effective to overcome the action of the clutch engaging means and apply the brake, means for adjusting the pressure thus applied to the brake, and means for relieving said pressure before the shaft has been completely stopped.

9. A starting and stopping mechanism having, in combination, a shaft, a brake, a clutch, means tending normally to move the clutch into engagement, an intermittently acting cam for throwing the clutch out of and the brake into engagement, links interposed between said cam, clutch and brake, one of said links being so arranged as to receive at all times the intermittent motion from said cam, means under the control of the operator for arranging said links so that the motion of the cam shall be effective to overcome the action of the clutch engaging means and apply the brake, means for adjusting the pressure thus applied to the brake, means for relieving said pressure before the shaft has been completely stopped, and means for subsequently stopping the shaft.

10. A stopping mechanism operating cam having, in combination, a rise to apply a brake, a no-movement portion to maintain constant pressure on the brake, a depression to relieve the brake and an abutment to stop the cam at a predetermined point.

11. A stopping mechanism, having, in combination, a shaft, a brake, means for applying the brake with increasing pressure, means for maintaining substantially constant pressure on the brake and means to relieve the brake before the shaft has been completely stopped.

12. A stopping mechanism, having, in combination, a shaft, a brake, means for applying the brake with increasing pressure, said means operating thereafter to maintain substantially constant pressure on the brake and then to relieve the brake, and means for stopping the shaft after the brake has been relieved.

13. A starting and stopping mechanism, having, in combination, a shaft, a driving clutch member, a stationary brake member, a friction member connected to rotate with the shaft and longitudinally movable thereon into engagement with either of said other members to drive or to stop the shaft, mechanism to move the friction member longitudinally, an operating cam for said mechanism, said operating cam comprising an inclined surface to shift the friction member into gradual engagement with the stationary brake member, a flat surface to maintain said engagement under substantially constant pressure for a predetermined period and a depression to relieve said pressure.

In testimony whereof I have signed my name to this specification.

SYLVESTER LEO GOOKIN.